United States Patent
Carter

(10) Patent No.: US 7,347,442 B1
(45) Date of Patent: Mar. 25, 2008

(54) STROLLER WITH A PORTABLE TABLE

(76) Inventor: Patricia Carter, 2353 Staten Ave., Memphis, TN (US) 38108

( * ) Notice: Subject to any disclaimer, the term of this patent is extended or adjusted under 35 U.S.C. 154(b) by 0 days.

(21) Appl. No.: 11/502,305

(22) Filed: Aug. 10, 2006

(51) Int. Cl.
*B62B 7/00* (2006.01)
(52) U.S. Cl. .................................. 280/642; 280/657
(58) Field of Classification Search ............ 280/642, 280/30, 643, 648, 649, 650, 655.1, 47.38; 297/183.4, 183.6, 144, 146
See application file for complete search history.

(56) References Cited

U.S. PATENT DOCUMENTS

| | | | |
|---|---|---|---|
| 3,420,571 A | * | 1/1969 | Moore .................. 297/124 |
| 4,165,127 A | * | 8/1979 | Vago .................. 297/344.18 |
| 5,299,336 A | | 4/1994 | Marteeny |
| 5,375,869 A | | 12/1994 | Hsiao |
| 5,692,766 A | * | 12/1997 | Wheeler .................. 280/642 |
| 5,857,740 A | | 1/1999 | Duboulet |
| 6,135,548 A | | 10/2000 | McGuire |
| D447,445 S | | 9/2001 | Lu |
| 6,604,786 B1 | | 8/2003 | Benden et al. |

* cited by examiner

*Primary Examiner*—Christopher P. Ellis
*Assistant Examiner*—Bridget Avery
(74) *Attorney, Agent, or Firm*—Lawrence J. Gibney, Jr.

(57) ABSTRACT

This is a device by which a stroller is also equipped with a table on the back of the stroller frame. The table is connected to the stroller frame and is allowed to rotate to provide a flat table surface for the user of the stroller. A safety strap is also provided on the top of the table surface to secure a child, if necessary.

3 Claims, 4 Drawing Sheets

STROLLER WITH A PORTABLE TABLE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

A. Field of the Invention

This relates to baby strollers in general and, in particular, using a folding portable table attached directly to the stroller frame. The stroller table will be flat and secured with a set of legs by which the table may be rotated and supported by a pair of legs.

B. Prior Art

There are many other prior art references to baby strollers in general. A representative example includes Hsiao, U.S. Pat. No. 5,375,869, which is a structure for a versatile baby stroller. However, it does not have a foldable table. Another example can be found at Marteeny, U.S. Pat. No. 5,299,336, which is a diaper-changing station. Another example can be found at Duboulat, U.S. Pat. No. 5,857,740. None of the prior references, however, have the same structure or the same features as the current application.

BRIEF SUMMARY OF THE INVENTION

This is a baby stroller, which has the added capacity of a portable foldable table on the rear of the stroller frame to provide additional usable space. The table will be comprised of a flat surface and a set of legs that are hinged to the underside of the table. The table is secured to the stroller frame probably by use of a rivet or pin, which allows the table to rotate for use.

When the table is rotated to be used, a pair of legs on the underside of the table surface will provide a means by which the table may be secured to the ground surface. A safety strap on the top surface of the table is also provided as an additional safety precaution.

As stated before the table is connected on one end of the stroller most likely by a pin or rivet. Additionally, like many baby strollers, it will have a basket on the bottom, which will be used for storage of various items. When the table is folded against the stroller, the basket will be enclosed on three sides.

DETAILED DESCRIPTION OF THE EMBODIMENTS

Figure 1:
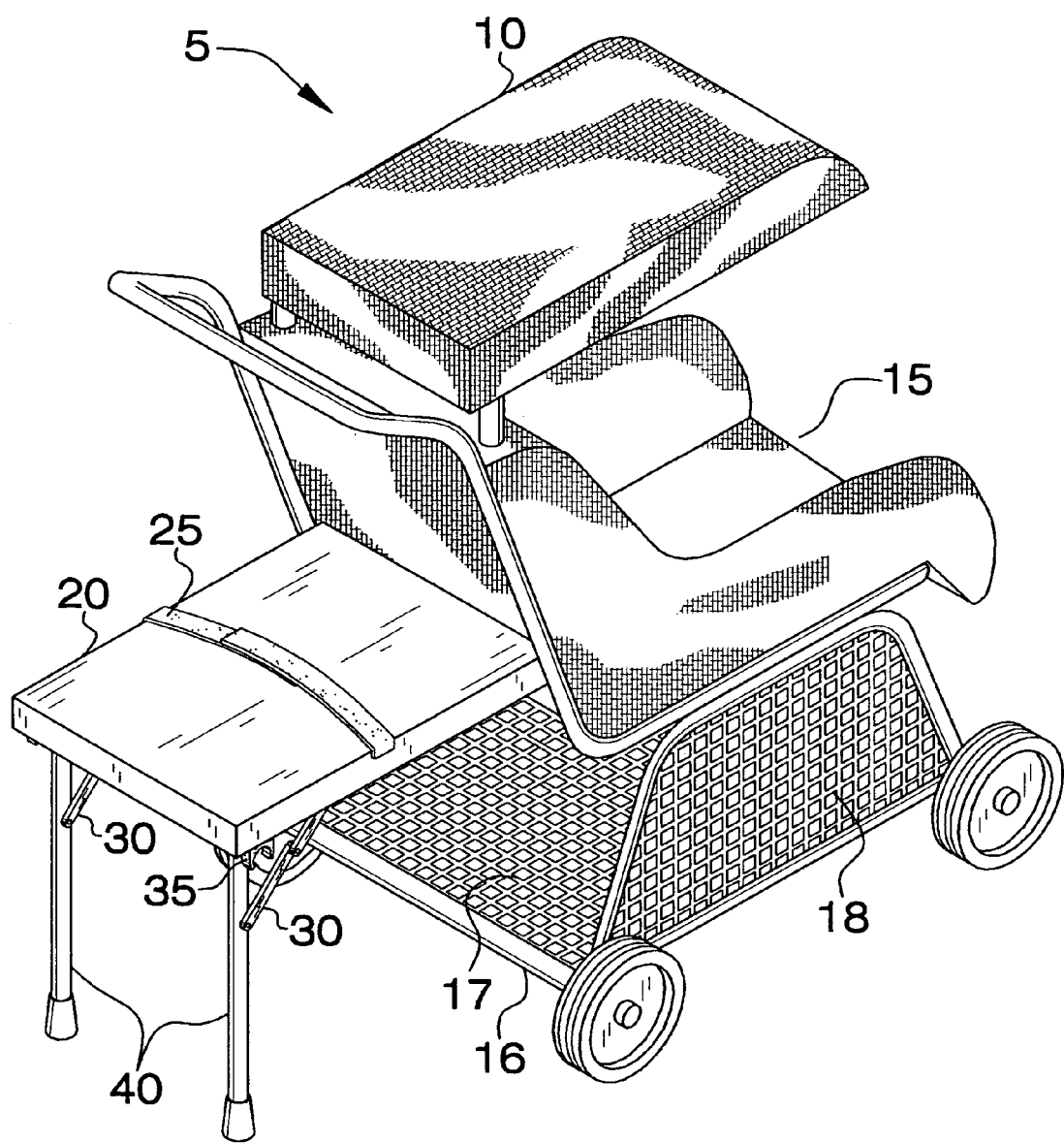
FIG. 1 is an isometric view of the device in use.
Figure 2:
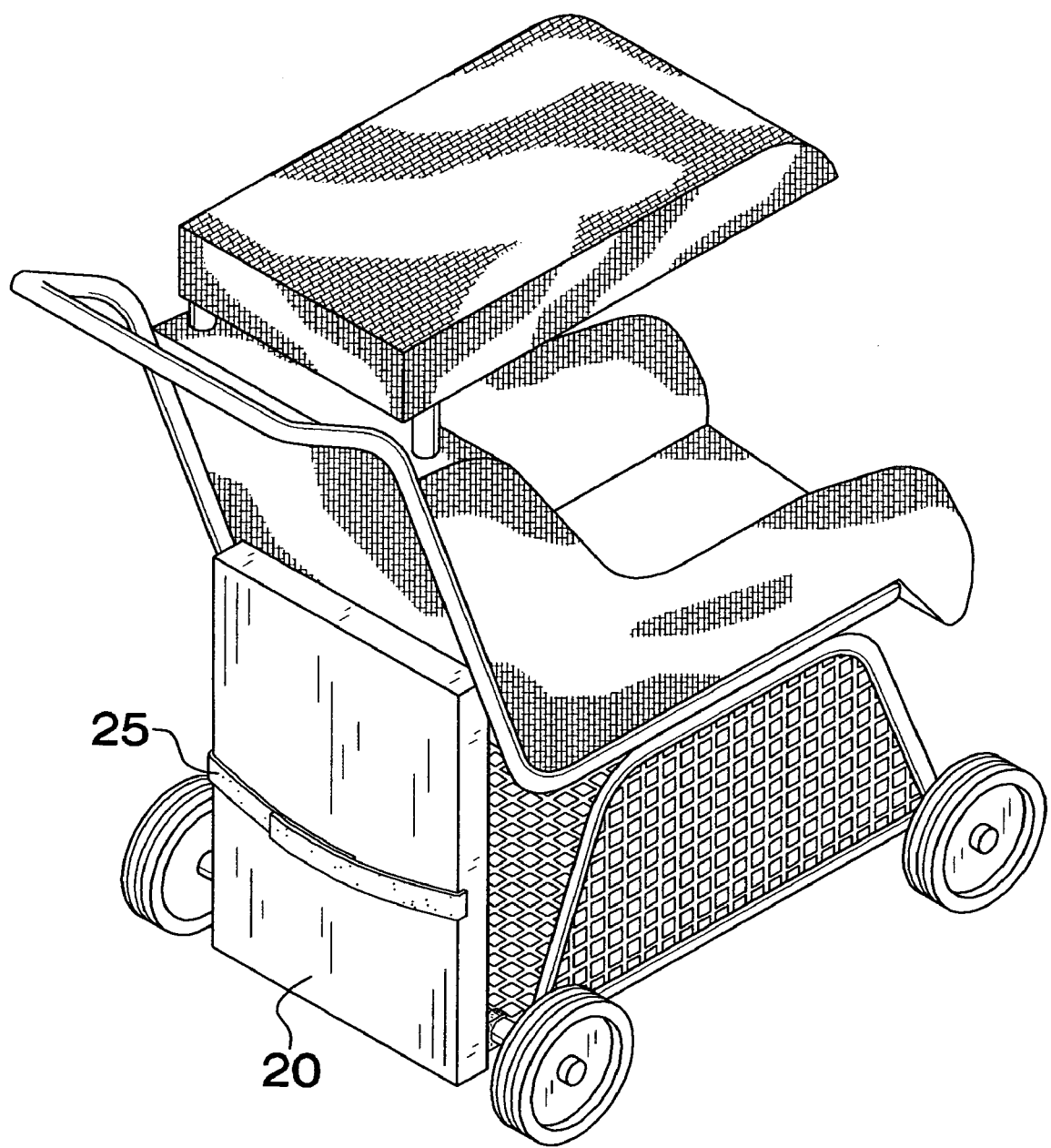
FIG. 2 is an isometric view of the device with the table folded against the stroller.

This is a baby stroller 5 with certain unique characteristics. It will have a basic stroller configuration, including the seat 15 and a canopy 10. FIG. 1,2

It will be supported by a set of wheels that are commonly found and are not being claimed in this application. On the bottom, beneath the seat structure of the stroller will be a basket, which will have a bottom 17, two sides 18, as well as a front and a back. The basket will be supported by the wheels, which are used for the stroller.

On the back portion of the stroller frame will be a table 20. This table 20 will be secured on one end to the stroller frame probably by a pin 43, which connects one end of the table to the frame of the stroller. The specific means of connection may vary but the means must allow the table to rotate.

The table 20 itself should be durable and constructed of material to withstand exposure to the elements and support the weight of a small child. A safety strap 25 will be provided on the top surface of the table 20 in the event the user of the stroller needs to secure an infant.

On one end of the table on the underside will be two legs 40, which fold against the underside of the table surface. FIG. 1,3 The legs are hinged, using hinge brackets 30 and arcuate clamps 35, which secures the table 20 to the member 16 of the frame of the basket. The arcuate clamp 35 secures the table structure to the member 16 of the frame structures, which connects the back wheels. The leg supports 41 for the table will be provided on one end of the device.

Figure 3:
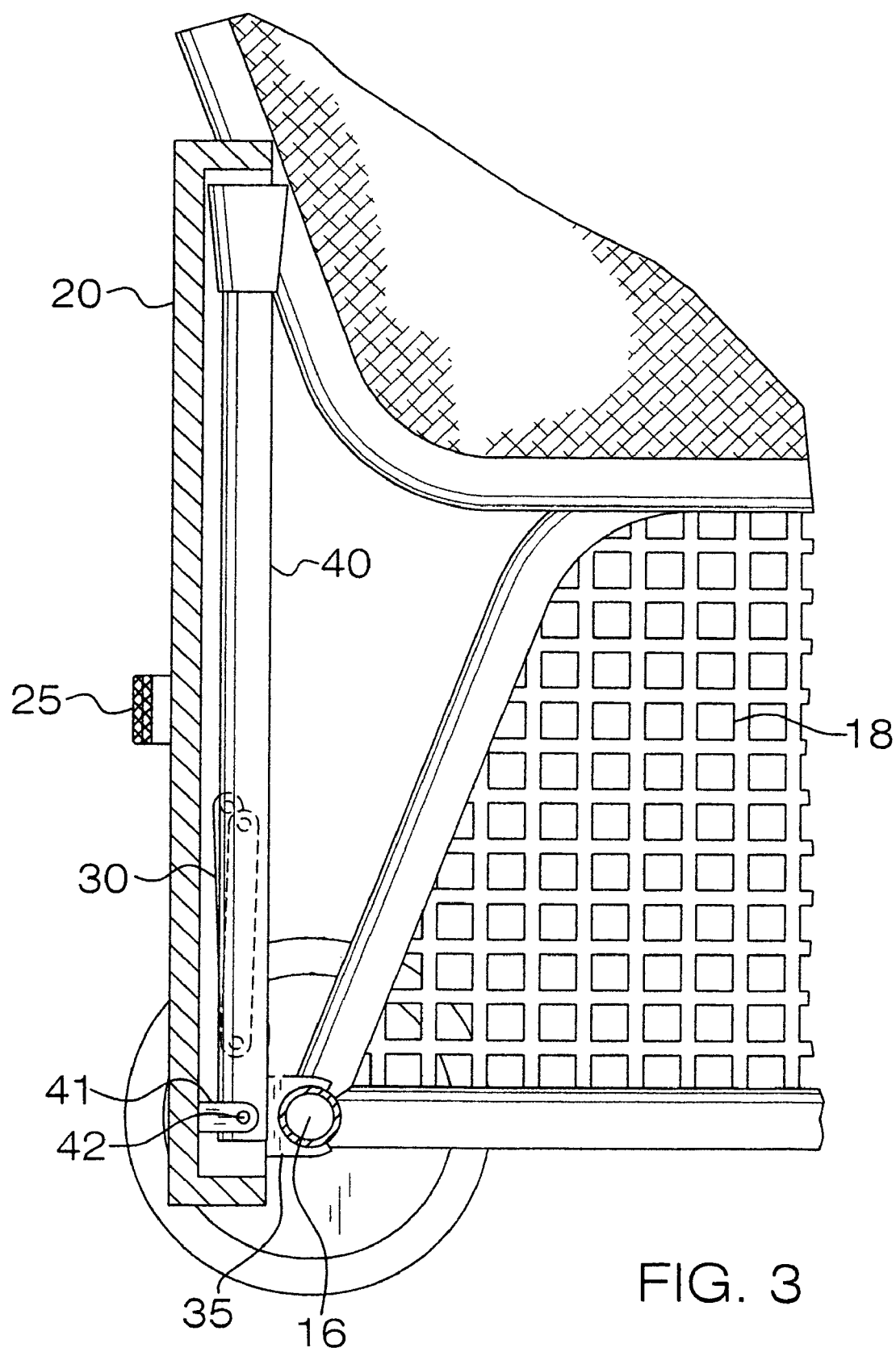
FIG. 3 is a fragmented side view of the stroller with the table flush against the stroller frame.
Figure 4:
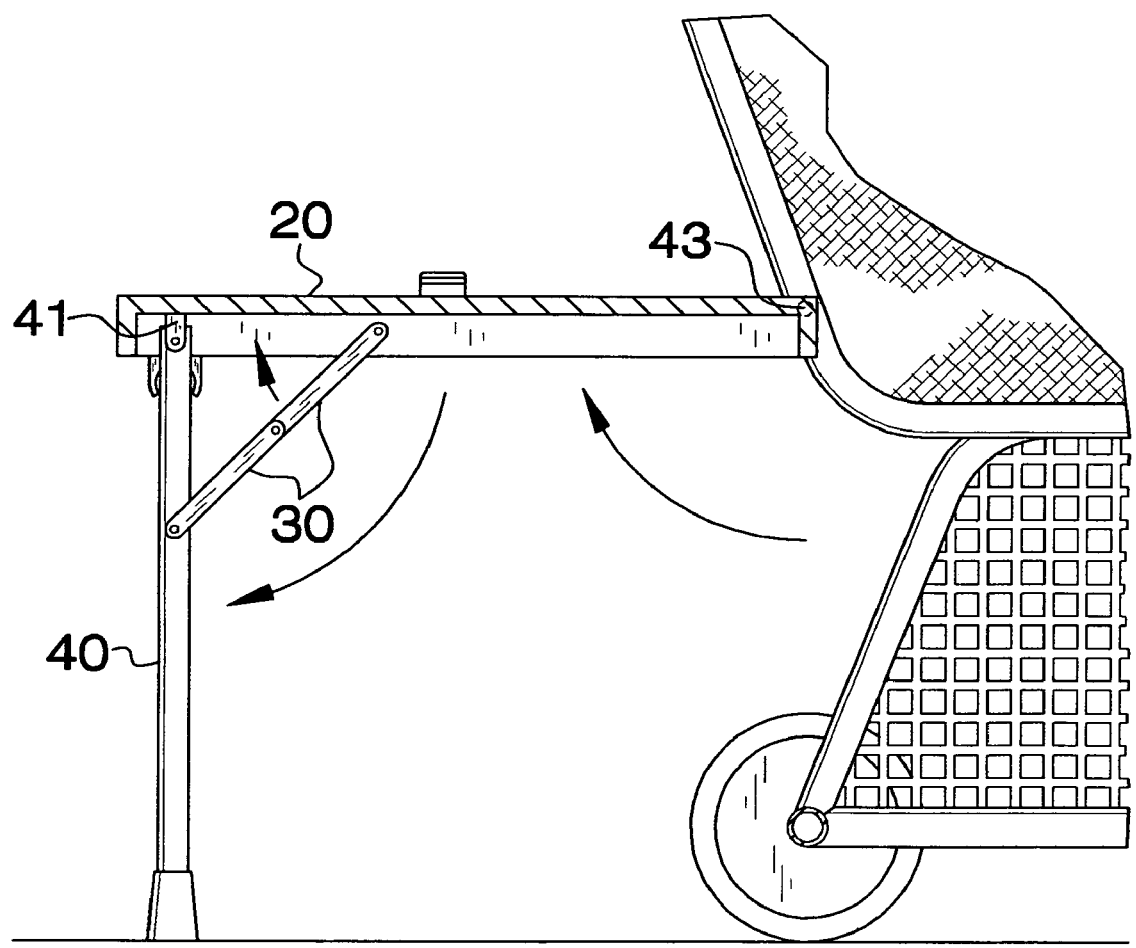
FIG. 4 is a fragmented side view of the device with the table extended and deployed.

When folded against the back of the stroller, the table will fold flush with the back of the stroller as depicted in FIG. 3. FIG. 4 depicts the table deployed.

While the embodiments of the invention have been disclosed, certain modifications may be made by those skilled in the art to modify the invention without departing from the spirit of the invention.

The invention claimed is:

1. A stroller/table combination, which is comprised of:
   a. a stroller;
      wherein the stroller has a seat for a child;
      wherein the stroller has a canopy;
      wherein the stroller is support by a plurality of wheels;
      wherein there is a storage area beneath the stroller seat;
      wherein the stroller is supported by a frame;
   b. a table;
      said table has a first end and a second end;
      wherein the first end of the table is secured to one side of the stroller frame;
      said table is secured to the frame of the stroller in the approximate middle of the frame of the stroller;
      said table is deployed by rotating the table;
      wherein a plurality of legs is provided on the second end of the table;
      wherein a safety strap is provided on the table;
      said safety strap extends across the surface of the table;
   c. arcuate clamp;
      wherein an arcuate clamp is provided on the second end of the table;
      said clamp is structured to a portion of the frame of the stroller;
   d. hinge brackets;
      wherein hinge brackets are provided to retract and extend the legs;
      said brackets are secured to the underside of the table;
   e. a means of connection for the table;

wherein a means of connection is provided to secure one end of the table to the stroller;
said means of connection allows rotation of the table.

2. The device as described in claim 1 wherein the means of connection for the table is a rivet.

3. The device as described in claims 1 wherein the means of connection for the table is a pin.

* * * * *